No. 776,272. PATENTED NOV. 29, 1904.
J. T. TOWSLEY.
ADJUSTABLE STOP FOR THE TABLES OF BAND SAWS.
APPLICATION FILED OCT. 17, 1904.
NO MODEL.
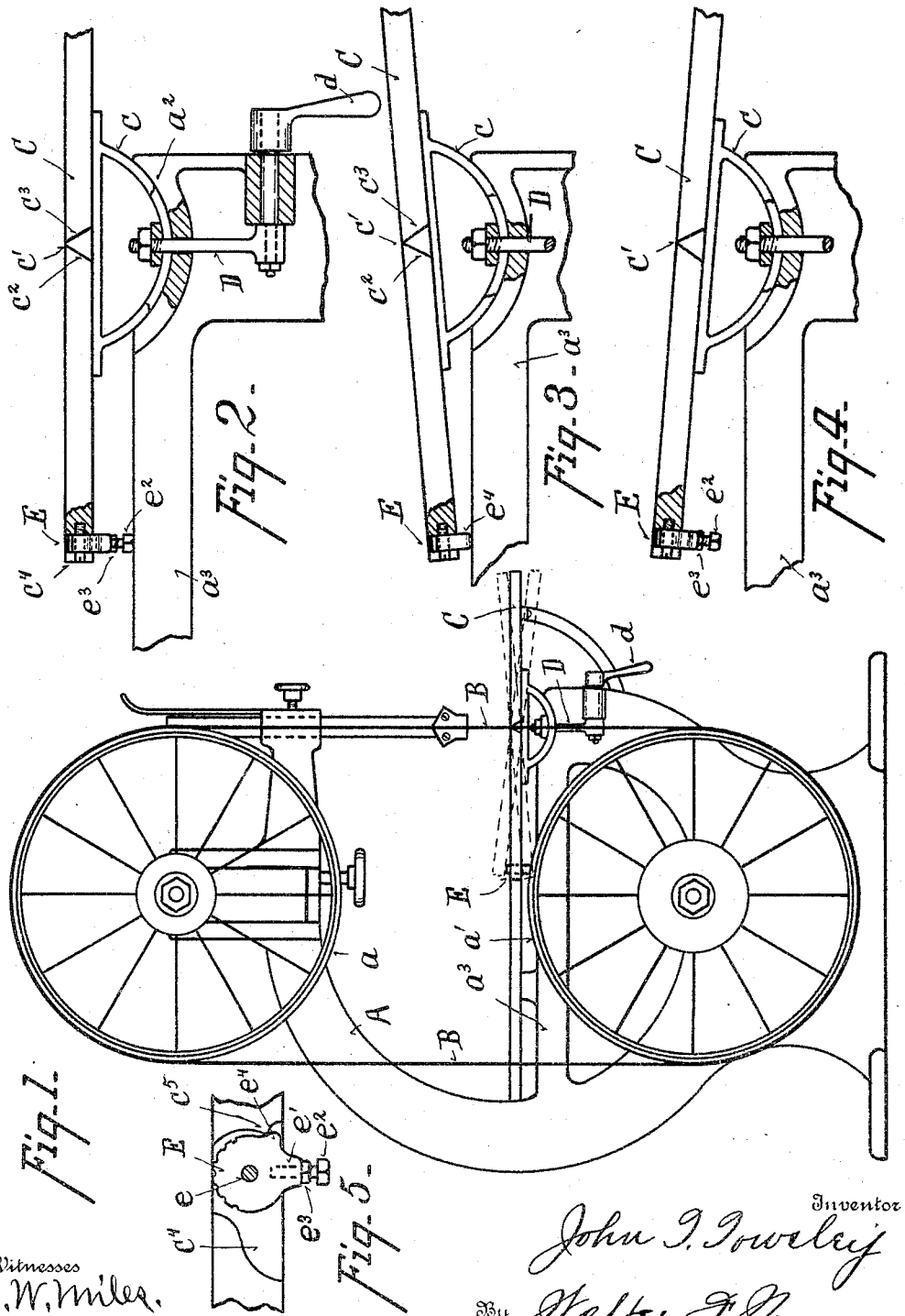

No. 776,272.	Patented November 29, 1904.

UNITED STATES PATENT OFFICE.

JOHN T. TOWSLEY, OF CINCINNATI, OHIO.

ADJUSTABLE STOP FOR THE TABLES OF BAND-SAWS.

SPECIFICATION forming part of Letters Patent No. 776,272, dated November 29, 1904.

Application filed October 17, 1904. Serial No. 228,721. (No model.)

*To all whom it may concern:*

Be it known that I, JOHN T. TOWSLEY, a citizen of the United States of America, and a resident of Cincinnati, county of Hamilton, State of Ohio, have invented certain new and useful Improvements in Adjustable Stops for the Tables of Band-Saws, of which the following is a specification.

The object of my invention is an attachment for the table of a band-saw by means of which the workman from the front of the table may readily cause the table to take a back tilt at the angle used in cutting certain classes of work, the attachment automatically readjusting itself when released from the inclined position to cause the table to rest in a perfectly horizontal position without the use of levels, plumbs, &c.

In the accompanying drawings, Figure 1 is a front elevation of a band-saw the table of which is provided with my adjustable stop, the dotted line showing the table inclined in a backward and in a forward position. Fig. 2 is a detail view, upon an enlarged scale, partly in front elevation and partly in section, showing the position of the stop when the table is in a horizontal position. Fig. 3 is a view similar to view 2, but showing the table inclined backward. Fig. 4 is a similar view with the table inclined forward. Fig. 5 is a detail view, upon a somewhat more enlarged scale, taken from the left side of the table, showing the stop in the position it occupies when the table is horizontal.

Referring to the parts, the frame A, pulleys $a$ $a'$, the band-saw B, the table C, having a curved bracket $c$ upon its under side to rest in a curved bearing $a^2$ on the end of the frame, the clamping-bolt D for locking the bracket $c$ in its bearings $a^2$, and the eccentric crank $d$ for engaging the bolt D are all of ordinary construction and need not be more specifically described.

The table has a slot $c'$ extending rearward from its front end for the passage of the saw B, the slot being beveled upon each side $c^2$ $c^3$ to permit the table to be tilted without affecting the saw. Upon its inner side table C has a recess $c^4$, within which is seated the adjustable stop, which consists of a cam-shaped disk E, which is rotatably journaled upon journal-pin $e$, which is seated in the side of the table. Upon side $e'$ disk E has an internal screw-threaded recess to receive an adjustable screw $e^2$, which has a locking-nut $e^3$ to hold the screw in the position to which it has been adjusted. Upon its side at a short distance from the screw $e^2$ disk E has a lug $e^4$. The upper edge of the disk E is knurled and is made flush with the top surface of the table.

In use after disk E is secured rotatably to the side of the table screw $e^2$ is adjusted so that when the disk E stands in its normal position, such as shown in full line, Fig. 5, it will cause the table to have a perfectly level position when the head of the screw rests upon the horizontal arm $a^3$ of the frame. If it be desired to work with the table in this position, it is clamped there by means of the crank $d$ and bolt D. Should it be desired to use the table to cut a bevel on the work, such as is used in bevel-patterns, the workman loosens the bolt D and with his finger rotates the disk E and allows the lug $e^4$ to rest on the arm $a^3$, as shown in Fig. 3. The table is then at the desired inclination, since the lug $e^4$ is made of a length such that it causes the table to take the right angle for cutting the normal bevel. When the clamp $d$ and bolt D are loosened and the table tilted forward again, the disk E automatically assumes the normal position, because the disk is heavier upon the side in which the screw $e^2$ is inserted. Recess $c^4$ has upon its side a projection $c^5$, which contacts the lug $e^4$ to cause the disk to assume a position such that the screw $e^2$ rests flat upon its head on the arm $a^3$.

Should the table be tilted forward, as shown in Fig. 4, the disk E will cause the table to rest in a horizontal position when it is released.

It is seen that the operation of causing the table to take the desired backward tilt is extremely simple and may be performed by the operator without his leaving the front of the table where he has been working and that the resetting of the table to a horizontal position after having cut a bevel is obtained without any adjustment or the use of any tools, such as levels, plumbs, &c.

What I claim is—

1. The combination of a frame, a table mounted rotatably in the frame, an oscillatory disk secured to the side of the table and adapted to be rotated to cause it to rest upon its side on the frame, and an adjustable screw upon another side of the disk to cause the table to take a horizontal position when said screw contacts the frame.

2. The combination of a frame, a table mounted rotatably in the frame, an oscillatory disk secured to the side of the table with an edge standing flush with the surface of the table and adapted to be rotated to cause it to rest upon its side upon the frame, and an adjustable screw upon another side of the disk to cause the table to have a horizontal position when said screw contacts the frame.

3. The combination of a frame, a table mounted rotatably in the frame and having a recess upon one side, an oscillatory disk secured within the recess and adapted to be rotated to cause it to rest upon its side upon the frame and an adjustable screw upon another side of the disk to cause the table to have a horizontal position when said screw contacts the frame.

JOHN T. TOWSLEY.

Witnesses:
WALTER F. MURRAY,
A. McCORMACK.